US009454395B2

(12) United States Patent
Zhang et al.

(10) Patent No.: US 9,454,395 B2
(45) Date of Patent: Sep. 27, 2016

(54) TRAFFIC-AWARE DATA CENTER VM PLACEMENT CONSIDERING JOB DYNAMIC AND SERVER HETEROGENEITY

(71) Applicant: Ericsson AB, Stockholm (SE)

(72) Inventors: Ying Zhang, Fremont, CA (US); Dan Li, Beijing (CN); Wu He, Beijing (CN)

(73) Assignee: Ericsson AB, Stockholm (SE)

( * ) Notice: Subject to any disclaimer, the term of this patent is extended or adjusted under 35 U.S.C. 154(b) by 56 days.

(21) Appl. No.: 14/586,758

(22) Filed: Dec. 30, 2014

(65) Prior Publication Data

US 2016/0147552 A1 May 26, 2016

Related U.S. Application Data

(60) Provisional application No. 62/082,484, filed on Nov. 20, 2014.

(51) Int. Cl.
*G06F 9/455* (2006.01)
*G06F 9/46* (2006.01)
*G06F 9/50* (2006.01)

(52) U.S. Cl.
CPC ......... *G06F 9/45558* (2013.01); *G06F 9/5072* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

2011/0225277 A1* 9/2011 Freimuth ............ G06F 9/45558
709/223
2014/0019961 A1 1/2014 Neuse et al.

OTHER PUBLICATIONS

Meng et al., Improving the Scalability of Data Center Networks with Traffic-aware Virtual Machine Placement, 2010, IEEE, Proceeding INFOCOM'10 Proceedings of the 29th conference on Information communications, pp. 1-9.*
Al-Fares, et al., "A scalable, commodity data center network architecture," in Proceedings of the ACM SIGCOMM 2008, pp. 63-74, ACM, 2008.
Alicherry, et al. "Optimizing data access latencies in cloud systems by intelligent virtual machine placement," in INFOCOM, 2013 Proceedings IEEE, pp. 647-655, IEEE, 2013.
Andreev, et al., "Balanced graph partitioning," Theory of Computing Systems, vol. 39, No. 6, pp. 929-939, 2006.
Bodik, et al., "Surviving failures in bandwidth-constrained datacenters," in Proceedings of the ACM SIGCOMM 2012, pp. 431-442, ACM, 2012.

(Continued)

*Primary Examiner* — Lewis A Bullock, Jr.
*Assistant Examiner* — Melissa Alfred
(74) *Attorney, Agent, or Firm* — Nicholson De Vos Webster & Elliott, LLP (57) ABSTRACT

A method is implemented by a computing device to provide traffic-aware virtual machine (VM) placement onto physical servers of a data center where the placement takes incremental VM job arrival and physical server heterogeneity into consideration. The method forms a graph including a new VM node, an existing VM node, and an edge between the nodes, where the edge is assigned a weight that represents a traffic demand. The method marks the existing VM node as belonging to one of the physical servers, adds dummy VM nodes to the graph, adds pseudo VM nodes to the graph, connects nodes belonging to a same physical server using an infinite weight pseudo edge, runs a balanced minimum k-cut problem algorithm on the graph to thereby divide the graph into sub-graphs, and maps the new VM to one of the physical servers based on the division of sub-graphs.

16 Claims, 7 Drawing Sheets

(56) References Cited

OTHER PUBLICATIONS

Chen, et al., "The case for evaluating mapreduce performance using workload suites," in Modeling, Analysis Simulation of Computer and Telecommunication Systems (MASCOTS), 2011 IEEE 19th International Symposium on, pp. 390-399, 2011.
Costa, et al., "Camdoop: Exploiting in-network aggregation for big data applications," in USENIX NSDI, vol. 12, 2012.
Dean, et al., "MapReduce: simplified data processing on large clusters," Communications of the ACM, vol. 51, No. 1, pp. 107-113, 2008.
Fang, et al., "Vmplanner: Optimizing virtual machine placement and traffic flow routing to reduce network power costs in cloud data centers," Computer Networks, vol. 57, No. 1, pp. 179-196, 2013.
Greenberg, et al., "The cost of a cloud: Research problems in data center networks," SIGCOMM Comput. Commun. Rev., vol. 39, pp. 68-73, Dec. 2008.
Greenberg, et al., "Vl2: a scalable and flexible data center network," in Proceedings of the ACM SIGCOMM 2009, pp. 51-62, ACM, 2009.
Guo, et al., "Bcube: a high performance, server-centric network architecture for modular data centers," in Proceedings of the ACM SIGCOMM 2009, pp. 63-74, ACM, 2009.
Hong, et al., "Finishing flows quickly with preemptive scheduling," in Proceedings of the ACM SIGCOMM, 2012.
Lanamark, Inc., "Lanamark Suite Overview," as published May 17, 2014, downloaded from <http://web.archive.org/web/20140517150026/http://www.lanamark.com/Product/Overview> on Mar. 16, 2016, 3 pages.
Li, et al., "Building mega data center from heterogeneous containers," Network Protocols (ICNP), 2011 19th IEEE International Conference, 10 pages.
Liu, et al., "A cloud test bed for china railway enterprise data center," Technical report, Intel Corporation, 2009, 10 pages.
Meng, et al., "Improving the scalability of data center networks with traffic-aware virtual machine placement,"INFOCOM, 2010 Proceedings, IEEE, 2010, 9 pages.

NetIQ Corporation, "PlateSpin Recon Overview," as published Oct. 28, 2014, downloaded from <http://web.archive.org/web/20141028204719/https://www.netiq.com/products/recon/> on Mar. 16, 2016, 2 pages.
Pfaff, et al, "Extending networking into the virtualization layer," Hotnets, 2009, 6 pages.
Saran, et al., "Finding k cuts within twice the optimal," SIAM Journal on Computing, vol. 24, No. 1, pp. 101-108, 1995.
Shen, et al., "Cloudscale: Elastic resource scaling for multi-tenant cloud systems," SOCC '11, ACM, 2011, 14 pages.
Shvachko, et al., "The Hadoop distributed file system," in Mass Storage Systems and Technologies (MSST), 2010 IEEE 26th Symposium on, pp. 1-10, IEEE, 2010.
Singla, et al., "Jellyfish: Networking data centers randomly," in Proceedings of the USENIX NSDI 2012, pp. 17-17, USENIX Association, 2012.
Vamanan, et al., "Deadline-aware datacenter tcp (d2tcp)," in Proceedings of the ACM SIGCOMM, 2012, 12 pages.
VMware, Inc., "VMware Capacity Planner Product Datasheet," downloaded from <https://www.vmware.com/products/capacity-planner/overview> on Mar. 16, 2016, 2 pages.
Wang, et al., "Consolidating virtual machines with dynamic bandwidth demand in data centers," in INFOCOM, 2011 Proceedings IEEE, pp. 71-75, IEEE, 2011.
Wilson, et al., "Better never than late: Meeting deadlines in datacenter networks," in Proceedings of the ACM SIGCOMM, 2011.
Bobroff, "Dynamic Placement of Virtual Machines for Managing SLA Violations," Integrated Network Management, 2007. IM'07. 10th IFIP/IEEE International Symposium on, pp. 119-128, IEEE, 2007.
Kochut, "On impact of dynamic virtual machine reallocation on data center efficiency," Modeling, Analysis and Simulation of Computers and Telecommunication Systems, 2008. MASCOTS 2008. IEEE International Symposium on, pp. 1-8, 2008.
Leinberger, "Multi-capacity bin packing algorithms with applications to job scheduling under multiple constraints," Parallel Processing, 1999. Proceedings. 1999 International Conference on, pp. 404-412, IEEE, 1999.

\* cited by examiner

Algorithm 1 DVMP

Input: $V=\{v_1,v_2,...,v_n\}$:new VMs
    $E=\{e_1,e_2,...,e_Y\}$:exisitng VMs
    $P=\{p_1,p_2,...,p_m\}$:physical servers
    $s_i$:Number of available slots on $p_i$
    $t_i$:Number of relevant existing VMs on $p_i$
    $W$:$w_{ij}$ is the traffic from $v_i$ to $v_j$
    $F$:$f_{ij}$ is the traffic between $v_i$ and $e_j$
Output: $\phi$ (VM placement scheme)
1:  $G \leftarrow$ ModelTransform($V,E,P, s_i, t_i, W,F$);
2:  $\{g_1,g_2, ..., g_m\} \leftarrow$ BalancedMinKCut($G,m$);
3:  for $k \leftarrow 1$ to $m$ do
4:     ID $\leftarrow -1$;
5:     for *each node* $u \in gk$ do
6:        if $u$ is marked then
7:           ID $\leftarrow u.mark$;
8:           break;
9:        end if
10:    end for
11:    for *each node* $u \in gk$ do
12:       if $u \in \{v_1,v_2, ..., v_n\}$ then
13:          $\phi(u) \leftarrow p_{ID}$;
14:       end if
15:    end for
16: end for
17: return $\phi$

FIG. 5

| Algorithm 2 ModelTransform |
|---|

Input: $V=\{v_1, v_2, ..., v_n\}$:new VMs
    $E=\{e_1, e_2, ..., e_y\}$:exisitng VMs
    $P=\{p_1, p_2, ..., p_m\}$:physical servers
    $s_i$:Number of available slots on $p_i$
    $t_i$:Number of relevant existing VMs on $p_i$
    $W$:$w_{ij}$ is the traffic from $v_i$ to $v_j$
    $F$:$f_{ij}$ is the traffic between $v_i$ and $e_j$
Output: $G$(The graph to be partitioned)
1:  $G \leftarrow$ InitializeGraph($V,E,W,F$);
2:  for each existing VM $e_j \in E$ do
3:     $e_j$.mark $\leftarrow \pi(e_j)$.ID;
4:  end for
5:  $G \leftarrow$ AddDummyVMs($G, \sum_{i=1}^{m} s_i - n$);
6:  $c_{max} \leftarrow max\{s_i + t_i\}, 1 \leq i \leq m$;
7:  $s_{max} \leftarrow max\{s_i\}, 1 \leq i \leq m$;
8:  $\delta \leftarrow 2s_{max} - c_{max} + 1$;
9:  for $i \leftarrow 1$ to $m$ do
10:    $h_i \leftarrow c_{max} - s_i$;
11:    if $\delta > 0$ then
12:      $h_i \leftarrow h_i + \delta$;
13:    end if
14:    $G \leftarrow$ AddPseudoVMs($G, h_i - t_i, i$);
15:    $G \leftarrow$ ConnectExistingVMs($G, i, \infty$, "tree");
16:  end for
17:  return $G$

TRAFFIC-AWARE DATA CENTER VM PLACEMENT CONSIDERING JOB DYNAMIC AND SERVER HETEROGENEITY

CROSS-REFERENCE TO RELATED APPLICATIONS

The present application claims the benefit of U.S. Provisional Patent Application No. 62/082,484, filed on Nov. 20, 2014, which is hereby incorporated by reference.

FIELD

Embodiments of the invention relate to the field of virtual machine (VM) placement in a data center. More specifically, the embodiments relate to traffic-aware VM placement that takes job dynamic and server heterogeneity into consideration.

BACKGROUND

A major challenge for data center operators is how to deal with the increasing amount of traffic shuffled among servers (e.g., "east-west" traffic generated by bandwidth-hungry applications). Some operators deal with this challenge by deploying advanced network topologies with more switches and links to expand network capacity. However, this requires extra infrastructure costs. In-network computation and in-network caching solutions are also proposed to reduce the traffic pressure to the network, but require modifications to the switch functionalities.

Various virtual machine (VM) placement schemes have been suggested to improve data center performance. Existing VM placement schemes aim at achieving performance goals such as consolidating multiple VMs into a physical server to improve resource multiplexing and migrating VMs to different physical machines for load balancing. However, these VM placement schemes do not aim at reducing the total network traffic.

Traffic-aware virtual machine (VM) placement is an effective way to solve the bandwidth explosion problem in data centers without significantly increasing capital expenditures. The basic idea is to model the traffic-aware VM placement problem as a balanced minimum k-cut problem (BMKP), in which the VMs of a job are placed into different physical servers and the optimization goal is to minimize the total bandwidth utilization in the network. However, the BMKP solution oversimplifies the problem and is based on assumptions that may not hold true for most practical data centers.

SUMMARY

A method is implemented by a computing device to provide traffic-aware virtual machine (VM) placement onto physical servers of a data center where the placement takes incremental VM job arrival and physical server heterogeneity into consideration. The method forms a graph including a new VM node and an existing VM node, where the new VM node represents a new VM to be placed on one of a plurality of physical servers and the existing VM node represents an existing VM assigned to one of the physical servers. The graph further includes an edge between the new VM node and the existing VM node, where the edge is assigned a weight that represents a traffic demand between the new VM node and the existing VM node. The method marks the existing VM node as belonging to the one of the physical servers assigned to the existing VM, adds dummy VM nodes to the graph such that a total number of new VM nodes and dummy VM nodes is equal to a total number of available VM slots on the physical servers, adds pseudo VM nodes to the graph, where each pseudo VM node is marked as belonging to one of the physical servers, and where the pseudo VM nodes are added to the graph such that each of the physical servers has a same total number of VM slots. The method connects nodes that are marked as belonging to a same physical server using a pseudo edge having an infinite weight, runs a balanced minimum k-cut problem algorithm on the graph to thereby divide the graph into a same number of sub-graphs as a number of physical servers, and maps the new VM to one of the physical servers based on a sub-graph to which the new VM node that represents the new VM belongs.

A computing device is configured to provide traffic-aware virtual machine (VM) placement onto physical servers of a data center where the placement takes incremental VM job arrival and physical server heterogeneity into consideration. The computing device includes a non-transitory machine readable medium to store a traffic-aware VM placement component. The computing device also includes a processor that is communicatively coupled to the non-transitory machine readable medium. The processor is configured to execute the traffic-aware VM placement component. The traffic-aware VM placement component is configured to form a graph including a new VM node and an existing VM node, where the new VM node represents a new VM to be placed on one of a plurality of physical servers and the existing VM node represents an existing VM assigned to one of the physical servers. The graph further includes an edge between the new VM node and the existing VM node, where the edges is assigned a weight that represents a traffic demand between the new VM node and the existing VM node. The traffic-aware VM placement component is further configured to mark the existing VM node as belonging to the one of the physical servers assigned to the existing VM, add dummy VM nodes to the graph such that a total number of new VM nodes and dummy VM nodes is equal to a total number of available VM slots on the physical servers, add pseudo VM nodes to the graph, where each pseudo VM node is marked as belonging to one of the physical servers, and where the pseudo VM nodes are added to the graph such that each of the physical servers has a same total number of VM slots. The traffic-aware VM placement component is further configured to connect nodes that are marked as belonging to a same physical server using a pseudo edge having an infinite weight, run a balanced minimum k-cut problem algorithm on the graph to thereby divide the graph into a same number of sub-graphs as a number of physical servers, and to map the new VM to one of the physical servers based on a sub-graph to which the new VM node that represents the new VM belongs.

A non-transitory computer readable storage medium has stored therein instructions to be executed by a computing device to provide traffic-aware virtual machine (VM) placement onto physical servers of a data center. The placement takes incremental VM job arrival and physical server heterogeneity into consideration. The instructions cause the computing device to perform a set of operations including, forming a graph including a new VM node and an existing VM node, where the new VM node represents a new VM to be placed on one of a plurality of physical servers and the existing VM node represents an existing VM assigned to one of the physical servers. The graph further including an edge between the new VM node and the existing VM node, where the edge is assigned a weight that represents a traffic demand between the new VM node and the existing VM node. The execution further causes the computing device to perform a set of operations including, marking the existing VM node as belonging to the one of the physical servers assigned to the existing VM, adding dummy VM nodes to the graph such that a total number of new VM nodes and dummy VM nodes is equal to a total number of available VM slots on the physical servers, adding pseudo VM nodes to the graph, where each pseudo VM node is marked as belonging to one of the physical servers, and where the pseudo VM nodes are added to the graph such that each of the physical servers has a same total number of VM slots. The execution further causes the computing device to perform a set of operations including, connecting nodes that are marked as belonging to a same physical server using a pseudo edge having an infinite weight, running a balanced minimum k-cut problem algorithm on the graph to thereby divide the graph into a same number of sub-graphs as a number of physical servers, and mapping the new VM to one of the physical servers based on a sub-graph to which the new VM node that represents the new VM belongs.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for traffic-aware placement of virtual machines (VMs) that takes job dynamic and server heterogeneity into consideration. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A computing device stores and transmits (internally and/or with other computing devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, a computing device (e.g., a computer) includes hardware and software, such as a set of one or more processors coupled to one or more machine-readable storage media to store code for execution on the set of processors and/or to store data. For instance, a computing device may include non-volatile memory containing the code since the non-volatile memory can persist code/data even when the computing device is turned off (when power is removed), and while the computing device is turned on that part of the code that is to be executed by the processor(s) of that computing device is typically copied from the slower non-volatile memory into volatile memory (e.g., dynamic random access memory (DRAM), static random access memory (SRAM)) of that computing device. Typical computing devices also include a set or one or more physical network interface(s) to establish network connections (to transmit and/or receive code and/or data using propagating signals) with other computing devices. One or more parts of an embodiment of the invention may be implemented using different combinations of software, firmware, and/or hardware.

A traffic-aware VM placement problem takes a set of VMs to be placed and the amount of traffic between VM pairs as input, and produces as an output, a mapping of the VMs to physical servers. The problem can be modeled as a graph partition problem. More specifically, the VMs and their communications can be represented as a graph G, where the nodes represent VMs of a job and the edges represent communication between two VMs. The traffic demand between VM pairs can usually be obtained or estimated in advance for many data center applications (e.g., web search, key-value store, data processing, etc.). Placing the VMs onto m physical servers is equivalent to partitioning G into m sub-graphs. The optimization goal is to minimize the total weight of edges across the partitioned sub-graphs. Several available graph partition models can be used to formulate this problem:

(1) Minimum K-cut Problem (MKP): Finding a set of edges, after removing them, G is partitioned into k sub-graphs: $g_1, g_2, \ldots, g_k$, and the sum of the weights of the removed edges is minimized. There is no constraint on the size of each sub-graph (i.e., $1 \leq |g_i| \leq |V|-k+1, 1 < i < k$).

(2) Balanced Minimum K-cut Problem (BMKP): A constraint is added to MKP that the sizes of the sub-graphs are strictly equal:

$$|g_i| = \frac{|V|}{k}, 1 \leq i \leq k.$$

(3) (k, v)-BMKP: This model is similar to BMKP, but it relaxes the constraint for sub-graph sizes. More specifically, for the k partitioned sub-graphs $g_1, g_2, \ldots, g_k$, only an upper-bound constraint is introduced to make them roughly equal:

$$|g_i| \leq v\frac{|V|}{k}(1 \leq i \leq k, v \geq 1).$$

Note that BMKP is a special case of (k,v)-BMKP where v=1.

Some prior art traffic-aware VM placement schemes model the problem as a pure BMKP problem. However, there are two hidden assumptions used in the model which may not be valid for practical data centers.

The first assumption is that the pure BMKP model assumes a "once-for-all" placement. That is, it assumes that all the VMs to be placed and their traffic matrices in the entire data center are given at once as input. However, in reality, jobs dynamically arrive and leave continuously. For example, in a public cloud, a tenant may incrementally request new VMs to dynamically expand computing capacity. Further, the new VMs that are to be deployed not only communicate among themselves, but may also communicate with existing VMs. The problem is even more common in a private data center, where many dynamically assigned jobs often belong to the same user/group and hence cross-job communications exist. Workload from Facebook data centers show that there is more traffic between new VMs and existing VMs than traffic between new VMs themselves, and hence the problem cannot be ignored.

Re-running the BMKP algorithm on all the VMs again whenever a new request arrives is not only computationally expensive, but also may lead to performance degradation because of the high cost of migrating existing VMs. If only the placement of the new VMs is considered by directly applying the BMKP model on the new VMs, this may lead to a suboptimal result. This is because the new job may go beyond communicating among the VMs of the new job itself, and may communicate with previously deployed VMs. For instance, the new VMs may need to read data from and write data to the existing distributed file system. Thus, the cross-job traffic cannot be ignored.

Figure 1A:
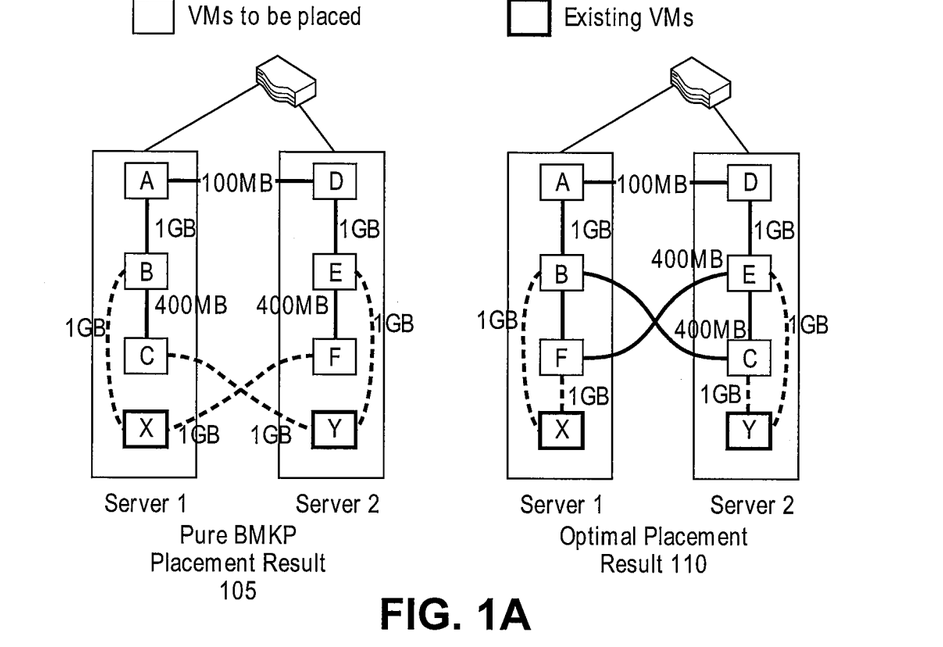
FIG. 1A illustrates an example of how running the pure BMKP algorithm directly on new VMs can lead to suboptimal placement of VMs.

FIG. 1A illustrates an example of how running the pure BMKP algorithm directly on new VMs can lead to suboptimal placement of VMs.

FIG. 1A illustrates a scenario where new VMs A-F are to be placed on two servers (Server 1 and Server 2). Server 1 and Server 2 are communicatively coupled over a network or any other type of connection that allows them to communicate with each other. Server 1 hosts an existing VM X and Server 2 hosts an existing VM Y. The traffic demand between the new VMs and existing VMs is denoted as $\xi(\cdot)$ and illustrated in the figure as a dashed line. In this example scenario, $\xi(B, X)=\xi(F, X)=\xi(C, Y)=\xi(E, Y)=1$ GB. Traffic demand between the new VMs is illustrated in the figure as a solid line. The traffic demand between VM A and VM B is 1 GB. The traffic demand between VM A and VM D is 100 MB. The traffic demand between VM B and VM C is 400 MB. The traffic demand between VM D and VM E is 1 GB. The traffic demand between VM E and VM F is 400 MB. Applying a pure BMKP model to place the new VMs without considering the traffic between the new VMs and existing VMs (i.e., without considering $\xi$) results in pure BMKP placement result 105. This placement results in total network traffic of 2.1 GB. On the other hand, the optimal placement result 110 results in total network traffic of 0.9 GB. Thus, in this example scenario, the pure BMKP model result in 2.3 times more network traffic compared to the optimal solution.

Another option is to greedily place the new VMs close to the data sources in existing VMs, as many MapReduce tasks do (i.e., putting a mapper to the server with the data). However, the greedy based approach does not consider global optimization and thus may also lead to suboptimal placement of VMs.

Figure 1B:
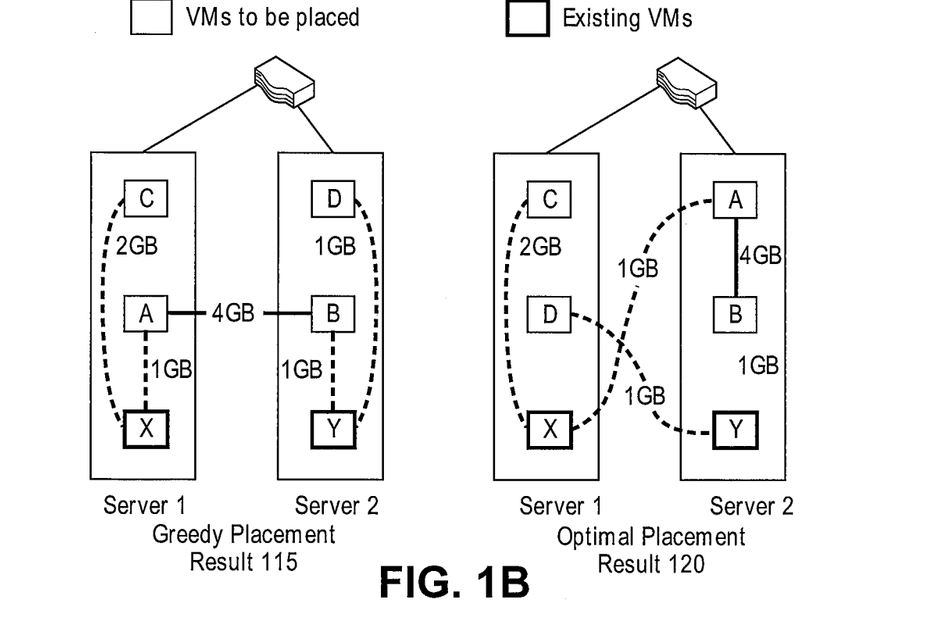
FIG. 1B illustrates an example of how applying a greedy VM placement approach can lead to suboptimal placement of VMs.

FIG. 1B illustrates an example of how applying a greedy VM placement approach can lead to suboptimal placement of VMs.

FIG. 1B illustrates a scenario where new VMs A-D are to be placed on two servers (Server 1 and Server 2). Server 1 and Server 2 are communicatively coupled over a network or any other type of connection that allows them to communicate with each other. Server 1 hosts an existing VM X and Server 2 hosts an existing VM Y. The traffic demand between the new VMs and existing VMs is denoted as $\xi(\cdot)$ and illustrated in the figure as a dashed line. In this example scenario, $\xi(A, X)=\xi(B, Y)=\xi(D, Y)=1$ GB and $\xi(C, X)=2$ GB. Traffic demand between the new VMs is illustrated in the figure as a solid line. The traffic demand between VM A and VM B is 4 GB. Applying a greedy placement of VMs close to the data source results in greedy placement 115. This placement results in total network traffic of 4 GB. On the other hand, the optimal placement result 120 results in total network traffic of 2 GB. Thus, in this example scenario, the greedy placement scheme results in 2 times more network traffic compared to the optimal solution.

As such, in order to achieve optimal or close to optimal VM placement, both the traffic between the new VMs and the traffic between new VMs and existing VMs need to be considered when deciding placement for VMs.

The second assumption of the pure BMKP model is that it assumes that the physical servers have an equal number of VM slots. However, data center servers may have heterogeneous configurations for several reasons. First, hardware innovation is rapid. It has been shown that data center owners usually incrementally purchase servers quarterly or yearly to accommodate service expansion. Servers bought at different times often have different hardware profiles (and thus different number of VM slots each server can host). The heterogeneity lies in the number of central processing unit (CPU) cores, memory space, etc. Also, for cost considerations, data center operators may buy servers from different vendors, which can also result in the heterogeneity of servers (and thus different number of VM slots each server can host).

Furthermore, as described above, computation jobs are often incrementally deployed in data centers. When placing VMs of a new job onto the physical servers, some VM slots of the servers may already be occupied by existing jobs. It is common practice to mix VMs of different tenants on the same physical machine. Such cases may lead to an unequal number of available VM slots in the physical servers.

The embodiments of the invention described herein below overcome the disadvantages of the prior art by relaxing the above mentioned hidden assumptions. The embodiments solve the problem of incremental VM placement for dynamic jobs on heterogeneous servers in data centers by capturing the coexistence of new and existing VMs, as well as the communication between them. To solve the new problem, which is NP-hard, embodiments provide a method to convert the problem to a standard BMKP model, which can then be solved by existing algorithms. In one embodiment, the conversion involves at least three steps. First, in order to handle the varied number of VM slots on different servers, pseudo VM slots are added to physical servers with less VM slots so as to make the physical servers equivalent (in terms of number of VM slots). Second, pseudo edges with infinite costs are added between existing VMs so that VMs that were previously located on the same physical server will still be grouped together in the new placement result. Third, the number of pseudo VM slots on each server is modified in a way that prevents existing VMs on separate servers from being grouped together in the new placement result. Various embodiments will be described herein below in additional detail.

Assume there are m physical servers in a data center, namely, $p_1, p_2 \ldots, p_m$. The i-th server has $c_i$ VM slots in total, of which $t_i$ are occupied and $s_i$ are available. The new job to be allocated has n VMs, namely, $v_1, v_2, \ldots, v_n$, and they may have traffic interaction with y existing VMs, $e_1, e_2, \ldots, e_y$. The locations of existing VMs are given by the following function:

$\pi: [e_1, e_2, \ldots, e_y] \rightarrow [p_1, p_2, \ldots, p_m]$

This function maps they existing servers to the m physical servers. In other words, existing VM, $e_j$ ($1 \leq j \leq y$), is located on server $\pi(e_j)$.

$f_{ij}$ ($1 \leq i \leq n$, $1 \leq j \leq y$) is the amount of traffic between new VM $v_i$ and existing VM $e_j$. Similarly, $w_{ij}$ ($1 \leq i, j \leq n$) is the amount of traffic between new VM $v_i$ and new VM $v_j$.

For any valid VM placement scheme, there is a corresponding function:

$\phi: [v_1, v_2, \ldots, v_n] \rightarrow [p_1, p_2, \ldots, p_m]$

This function maps the n new VMs to the m physical servers.

The optimization goal is to minimize the total amount of traffic the new job poses to the physical network infrastructure, which is denoted by A. VMs located on the same physical server will not contribute to the total network traffic. As such, A can be expressed as follows:

$$A = \sum_{\substack{i=1 \\ \phi(v_i) \neq \phi(e_j)}}^{n} \sum_{j=1}^{y} f_{ij} + \sum_{\substack{i=1 \\ \phi(v_i) \neq \phi(v_j)}}^{n-1} \sum_{j=i+1}^{n} (w_{ij} + w_{ji}) \quad (1)$$

The VM placement problem is then transformed as finding a $\phi$ which minimizes the objective A, under the following constraints:

$$n \leq \Sigma_{i=1}^{m}(c_i - t_i) \quad (2)$$

Constraint (2) guarantees that the number of new VMs does not exceed the total number of available VM slots in the data center.

$$b_{ij} = \begin{cases} 1 & \phi(v_i) = p_j \\ 0 & \phi(v_i) \neq p_j \end{cases}, \forall 1 \leq i \leq n, 1 \leq j \leq m \quad (3)$$

A Boolean matrix, $[b_{ij}]_{n \times m}$, can be used to represent the VM placement solution, where $b_{ij}=1$ if VM $v_i$ is placed onto server $p_j$ (i.e., $\phi(v_i)=p_j$), as shown by constraint (3).

$$t_j \Sigma_{i=1}^{n} b_{ij}, \forall 1 \leq j \leq m \quad (4)$$

Constraint (4) guarantees that the number of VMs placed onto a server $p_j$ does not exceed the number of available VM slots on that server.

$$\Sigma_{j=1}^{m} b_{ij} = 1, \forall 1 \leq i \leq n \quad (5)$$

Constraint (5) guarantees that each VM can only be placed on one physical server.

Minimizing the total amount of traffic (i.e., minimizing A) is an NP-hard problem. A summary of the notations used herein is provided in Table 1 below.

TABLE 1

| | |
|---|---|
| n | Number of new VMs to deploy in a job |
| V | The set of new VMs in a job, V = $\{v_1, v_2, \ldots, v_n\}$ |
| m | Number of physical servers |
| P | The set of physical servers, P = $\{p_1, p_2, \ldots, p_m\}$ |
| y | Number of existing VMs that communicate with new VMs |
| E | The set of existing VMs that communicate with new VMs, E = $\{e_1, e_2, \ldots, e_y\}$ |
| $c_i$ | Total number of VM slots in the i-th server |
| $t_i$ | Number of occupied VM slots in the i-th server |
| $s_i$ | Number of available VM slots in the i-th server |
| $h_i$ | Number of marked nodes corresponding to the i-th server |
| d | Number of dummy VM nodes |
| z | Size of each sub-graph (group) in the transformed BMKP problem |
| W | Traffic matrix between new VMs, W = $\{w_{ij} \mid$ traffic size from vi to vj, $1 \leq i, j \leq n\}$ |
| F | Traffic matrix between new VMs and existing VMs, F = $\{f_{ij} \mid$ traffic size between $v_i$ and $e_j$, $1 \leq i \leq n, 1 \leq j \leq m\}$ |

Figure 2:
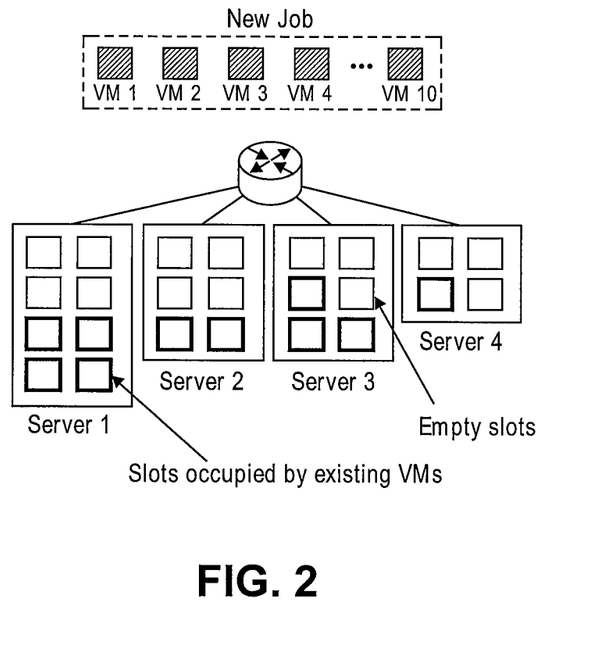
FIG. 2 is a diagram illustrating an example VM-placement scenario.

FIG. 2 is a diagram illustrating an example VM-placement scenario.

A new job has 10 new VMs (VM 1, VM 2, ..., VM 10) that need to be deployed on 4 physical servers (Server 1, Server 2, Server 3, and Server 4). The servers are communicatively coupled over a network or any type of connection that allows the servers to communicate with each other. Server 1 has a total of 8 VM slots, of which 4 are available and 4 are occupied by existing VMs. Server 2 has a total of 6 VM slots, of which 4 are available and 2 are occupied by existing VMs. Server 3 has a total of 6 VM slots, of which 3 are available and 3 are occupied by existing VMs. Server 4 has a total of 4 VM slots, of which 3 are available and 1 is occupied by an existing VM. The new VMs have traffic with the 10 existing VMs (depicted as dark slots). In order to capture all the new and existing VMs (as well as the traffic interaction to new VMs), a graph G with 20 nodes (representing the new VMs and existing VMs) is formed. A desired VM placement scheme corresponds to a partition of G into 4 sub-graphs: $g_1, g_2, g_3, g_4$, where the size of each sub-graph should satisfy $|g_1| \in [4,8]$, $|g_2| \in [2,6]$, $|g_3| \in [3,6]$, and $|g_4| \in [1,4]$ to stay within the number of VM slots on each of the physical servers. Also, each existing VM $e_i$ ($1 \le i \le y$) should still remain in its original server $\pi(e_i)$. As will be discussed below, existing graph partitioning models cannot be directly applied to solve this VM placement problem:

MKP: The minimum k-cut model is not suitable for solving this problem because it has no constraint on the size of sub-graphs. As a result, G may be partitioned into sub-graphs with undesired sizes that do not fit the number of VM slots on each server.

BMKP: Assume the pure BMKP model is applied to this problem (i.e., partition G into 4 sub-graphs with each sub-graph containing 5 nodes). This does not work because server 4 only has 4 VM slots.

(k, v)-BMKP: The (k, v)-BMKP model enforces an upper-bound constraint on the size of each sub-graph. If the upper bound is set to 5, it is the same as BMKP discussed above, which does not work. Likewise, if the upper bound is set to any value larger than 5, this also does not work because server 4 only has 4 VM slots.

Thus, the three models above cannot be directly applied to solve the target problem. However, in one embodiment, the target problem can be transformed to a problem that can be solved by an existing model, and thus an existing algorithm can be used to solve the target problem. In one embodiment, the target problem is transformed to a BMKP model and can be solved using existing algorithms for solving BMKP.

Several challenges need to be addressed in order to transform the target model of incremental VM placement on heterogeneous servers into a BMKP model. In the target problem, the number of VM slots on each of the servers is different. However, in the transformed BMKP model, the number of VM slots on each server need to be made equal. Another challenge is that a general graph partition algorithm treats all nodes equally and only focuses on finding a k-cut with minimum weight. As a result, existing VMs on the same physical server may be partitioned into different sub-graphs, making it infeasible to map the resultant sub-graphs to physical servers. In the transformed BMKP model, all the existing VMs on the same server should be packed together in the same sub-graph in the placement result. Another challenge is that a general graph partition algorithm may cause existing VMs on different servers to be merged into the same sub-graph. The transformed BMKP model should separate existing VMs on different servers into different sub-graphs in the placement result.

In one embodiment, the concept of pseudo VM slots and pseudo VMs are introduced to help the model transformation. For each server ($p_i$, $1 \le i \le m$) with $s_i$ available VM slots and $t_i$ occupied VM slots, it can just be regarded as a server with $s_i$ available VM slots and $h_i \ge t_i$ occupied VM slots. This transformation does not affect the placement of new VMs, since there are still $s_i$ available VM slots on server $p_i$. The extra $h_i - t_i$ VM slots are imagined and in reality do not exist, so they are referred to herein as pseudo VM slots. Correspondingly, the imagined VMs occupying these pseudo VM slots are referred to herein as pseudo VMs. Pseudo VMs can be regarded as existing VMs except they do not send or receive any traffic. Pseudo VM slots and pseudo VMs can be used to make the number of VM slots on each of the physical servers the same without affecting the optimal placement solution for the new VMs.

Also, the concept of pseudo edges is introduced to help the model transformation. Pseudo edges, as referred to herein, are imaginary additional edges between VMs. Pseudo edges having infinite weights can be used to prevent existing VMs on the same server from being separated in the placement result. The pseudo edges should not affect the optimal VM placement solution.

Also, the concept of dummy VMs is introduced to help the model transformation. In general, there are fewer new VMs than available VM slots (i.e., $n \le \Sigma_{i=1}^{m} s_i$). Dummy VMs are introduced to make the number of new VMs and available VM slots equal. A dummy VM is regarded as a new VM to be deployed except it does not send or receive any traffic, and adding the dummy VMs should not affect the optimal VM placement solution.

By using the concepts of pseudo VM slots, pseudo VMs, and dummy VMs, an incremental VM placement problem on heterogeneous servers can be transformed into a BMKP model.

Figure 3A:
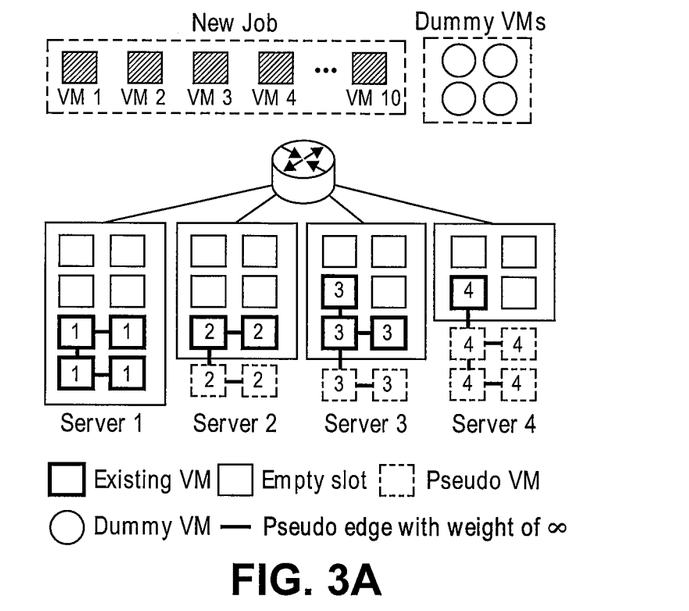
FIG. 3A is a diagram illustrating one embodiment of how pseudo VM slots, pseudo VMs, and dummy VMs can be used to deal with server heterogeneity and to pack existing servers together on the same server.

FIG. 3A is a diagram illustrating one embodiment of how pseudo VM slots, pseudo VMs, and dummy VMs can be used to deal with server heterogeneity and to pack existing servers together on the same server.

For illustration purposes, FIG. 3A uses the VM placement scenario described above with reference to FIG. 2 as an example. However, one having ordinary skill in the art will appreciate that the operations and concepts described herein below can be applied to different VM placement scenarios having different number of new VMs to be placed, different number of servers, different traffic demands between VMs, and different configuration of servers (e.g., different number of occupied VM slots on each server, different number of total VM slots on each server, etc.).

Pseudo VM slots can be added to each server to make them hold an equal number of VM slots. In the example of FIG. 3A, 2 pseudo VM slots are added to server 2, 2 pseudo VM slots are added to server 3, and 4 pseudo VM slots are added to server 4 so that each server has a total of 8 VM slots. Pseudo VMs added to pseudo VM slots on server $p_i$ are marked with i to show that they should be mapped to server $p_i$ however the new VMs are placed. Similarly, the existing VMs that are deployed on server $p_i$ should be mapped to server $p_i$ as well. In the transformed problem, pseudo VMs are regarded as existing VMs and thus pseudo VMs can be regarded as existing VMs marked with the corresponding server identity. By adding pseudo VM slots/VMs, the challenge of server heterogeneity can be resolved.

To address the challenge of preventing graph partition algorithms from partitioning existing VMs on the same server apart, the existing VMs on each server can be connected by pseudo edges having a weight of infinity (or a relatively large value). This is to ensure that graph partitioning algorithms will not separate VMs residing on the same physical server. A graph partitioning algorithm will not separate existing VMs connected by a pseudo edge because doing so would result in a k-cut that has a weight of infinity (or a very large value), which will not be a desirable solution.

Figure 3B:
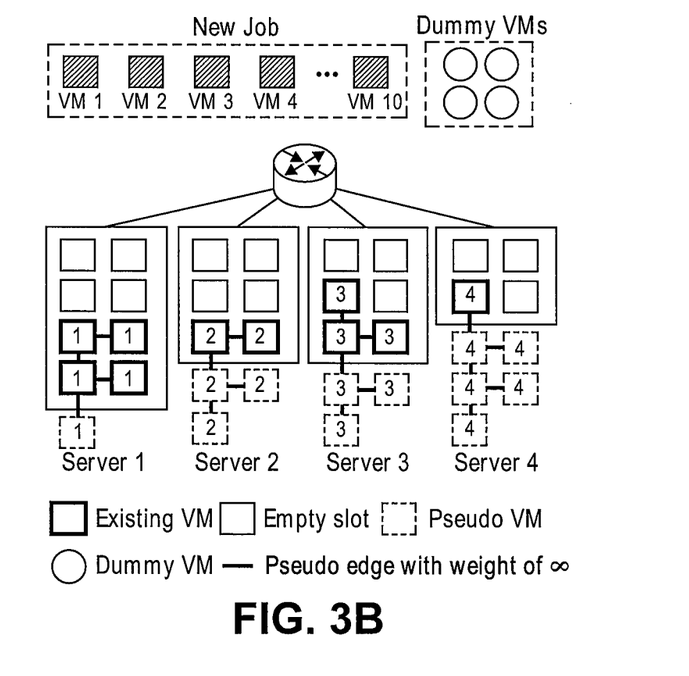
FIG. 3B is a diagram illustrating one embodiment of how the number of pseudo VM slots can be changed to ensure that existing VMs on different servers remain separated.

FIG. 3B is a diagram illustrating one embodiment of how the number of pseudo VM slots can be changed to ensure that existing VMs on different servers remain separated.

The problem of existing VMs on different servers merging onto the same server occurs when the total number of nodes that are marked with either i or j ($1 \leq i,j \leq m$) is within the sub-graph size. For example, in FIG. 3A, there are 4 nodes marked with i=1 and 4 nodes marked with j=2, and the sub-graph size is 8. Hence it is possible for the 8 marked nodes (4 nodes marked with i=1 and 4 nodes marked with j=2) to be merged into the same sub-graph. To solve this problem, the number of pseudo VM slots/VMs on each server can be changed by a given amount (i.e., $\delta$). Now referring to FIG. 3B, if the number of pseudo VM slots is increased by one ($\delta$=1), the problem is solved. The sub-graph size is now 9, while the total number of nodes with mark 1 or mark 2 is 10. As such, the 1-marked nodes and 2-marked nodes cannot be merged into the same sub-graph.

The following theorem guarantees that a feasible value for $\delta$ can always be found to handle this challenge:

Theorem: Let $\delta = 2s_{max} - c_{max} + 1$, where $s_{max}$ and $c_{max}$ are the maximum number of available VM slots and total VM slots in the servers, respectively. If $\delta \leq 0$, existing VMs on different servers can always be separated into different sub-graphs in the result. Otherwise, by adding $\delta$ extra pseudo VM slots to each server, the same goal can be achieved.

Proof: In the transformed problem, pseudo VM slots are added for each server to make them hold equal number of VM slots (i.e., $c_{max}$). The theorem can be proven by contradiction.

In the case that $\delta \leq 0$, the size of each sub-graph is $c_{max}$, including $s_i$ available VM slots and $h_i$ occupied VM slots (existing VMs). If existing VMs on server $p_i$ and $p_j$ ($1 \leq i,j \leq m$) are in the same sub-graph, the size of the resulting sub-graph is at least $h_i + h_j$. Since $\delta \leq 0$, this means that $c_{max} \leq 2s_{max} + 1$. Hence, there is $h_i + h_j = 2c_{max} - s_i - s_j = c_{max} + (c_{max} - s_i - s_j) \geq c_{max} + (s_{max} - s_i) + (s_{max} - s_j) + 1 > c_{max}$. In other words, the size of the resulting sub-graph is even larger than $c_{max}$, which leads to a contradiction. Hence, it is impossible for existing VMs on different servers to be merged into the same sub-graph.

In the case that $\delta > 0$, by adding $\delta$ extra pseudo VM slots to each server, the number of VM slots on each server is still identical. Denoting the consequent sub-graph size as z, then $z = c_{max} + \delta = 2s_{max} + 1$. If existing VMs on server $p_i$ and $p_j$ ($1 \leq i,j \leq m$) are in the same sub-graph, the size of the resulting sub-graph is at least $h_i + h_j = 2z - s_i - s_j = z + (z - s_i - s_j) = z + (s_{max} - s_i) + (s_{max} - s_j) + 1 > z$. In other words, the size of the resulting sub-graph is even larger than z. Hence, existing VMs on different servers cannot be merged into the same sub-graph.

Figure 4:
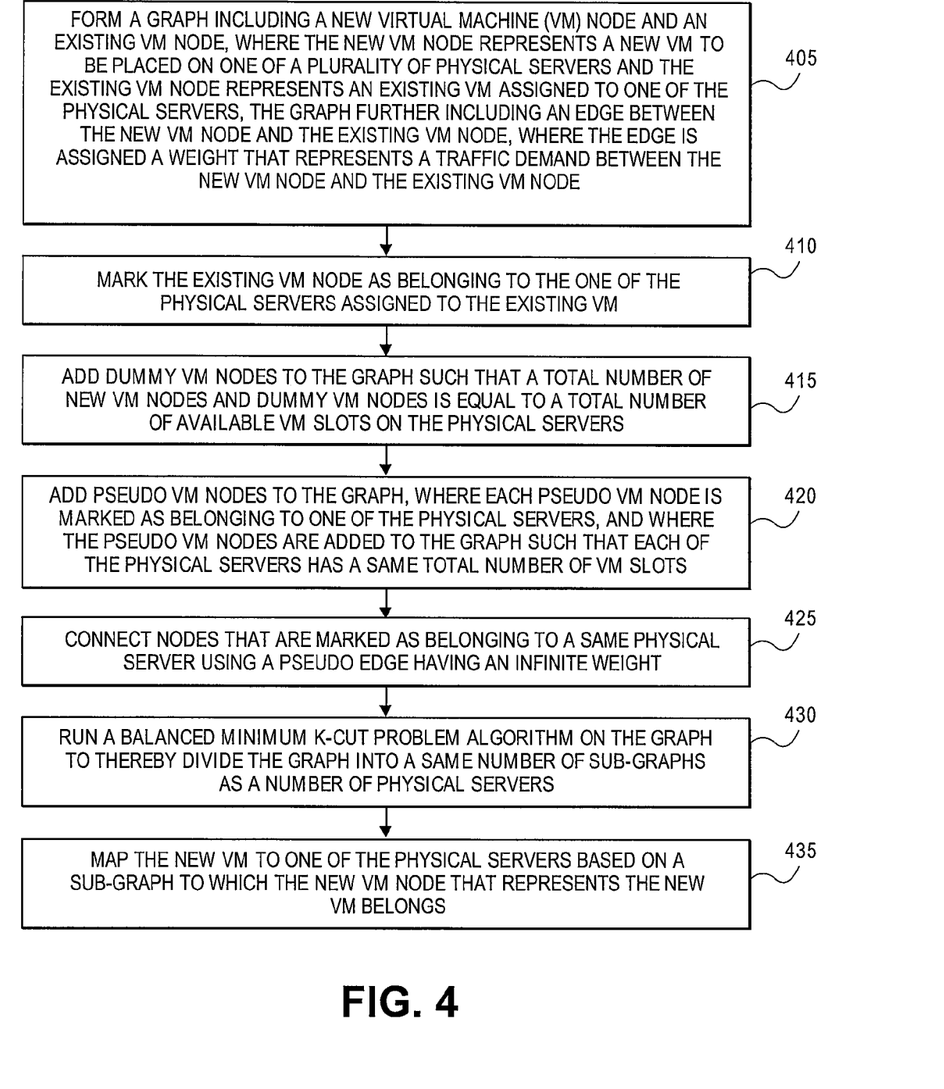
FIG. 4 is a flow diagram of one embodiment of a process for traffic-aware VM placement that takes incremental VM placement and server heterogeneity into consideration.

FIG. 4 is a flow diagram of one embodiment of a process for traffic-aware VM placement that takes incremental VM placement and server heterogeneity into consideration. The process may be performed by a computing device such as the computing device described below with reference to FIG. 7. In one embodiment, the process is performed by a computing device that serves as a VM resource manager of a data center. In some embodiments, the process is performed by one or more physical servers of the data center. The operations in the flow diagram will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment the process is initiated when the computing device determines that a set of new VMs need to be placed on the physical servers. In one embodiment, the computing device has knowledge of one or more of the following parameters before initiating the traffic-aware VM placement process: the physical servers (i.e., $\{p_1, p_2, \ldots, p_m\}$), the new VMs that need to be placed on physical servers (i.e., $\{v_1, v_2, \ldots, v_n\}$), the existing VMs on the physical servers (i.e., $\{e_1, e_2, \ldots, e_y\}$), the number of available VM slots on each physical server (i.e., $s_i$), the number of relevant existing VMs on each server (i.e., $t_i$), the traffic demand between new VMs (i.e., $w_{ij}$), the traffic demand between new VMs and existing VMs (i.e., $f_{ij}$), and the mapping of existing VMs to physical servers (i.e., $\pi$). In some embodiments one or more of these parameters can be detected or obtained by the traffic-aware VM process in real time, as needed. In one embodiment, one or more of these parameters can be learned from cloud statistics of a data center.

The computing device forms a graph that includes one or more new VM nodes and one or more existing VM nodes, where each of the new VM nodes represents a new VM to be placed on one of a plurality of physical servers and each of the existing VM nodes represent an existing VM assigned to one of the physical servers (block 405). The graph also includes one or more edges between the new VM nodes and other nodes of the graph (e.g., an edge between a new VM node and an existing VM node or an edge between two new VM nodes), where each of the edges is assigned a weight that represents a traffic demand between nodes connected by that edge. In one embodiment, the weight of the edges (representing traffic demand) can be obtained or estimated in advance.

The computing device marks each of the existing VM nodes as belonging to their respective VM's assigned physical server (block 410). This ensures that existing VM nodes will be mapped back to their original hosting physical server.

The computing device adds dummy VM nodes to the graph such that a total number of new VM nodes and dummy VM nodes is equal to a total number of available VM slots on the physical servers (block 415). As discussed above, a dummy VM is regarded as a new VM to be deployed except it does not send or receive any traffic. As such, a dummy VM node is a node that is not connected to any other node. In one embodiment, the number of dummy VM nodes to be added to the graph is given by $(\Sigma_{i=1}^{m} s_i) - n$, where m is the number of physical servers, $s_i$ is the number of available VM slots in the i-th physical server, and n is the number of new VMs to be deployed.

The computing device adds pseudo VM nodes to the graph, where each pseudo VM is marked as belonging to one of the physical servers, and where the pseudo VM nodes are added to the graph such that each of the physical servers has a same total number of VM slots (block 420). In one embodiment, the total number of VM slots for a given physical server is the sum of the number of available VM slots of that physical server, the number of existing VM nodes marked as belonging to that physical server, and the number of pseudo VM nodes marked as belonging to that physical server. In one embodiment, pseudo VM nodes are added to the graph such that the total number of VM slots on each physical server is given by $c_{max} = \max \{s_i + t_i\}$, where $s_i$ is the number of available VM slots in the i-th physical server and $t_i$ is the number of occupied VM slots in the i-th physical server. In another embodiment, the number of VM slots on each physical server is given by $c_{max} + \delta$ if $\delta$ is larger than zero, where $\delta = 2s_{max} - c_{max} + 1$ and $s_{max} = \max \{s_i\}$.

The computing device connects nodes that are marked as belonging to a same physical server using a pseudo edge having an infinite weight (block 425). This ensures that existing VMs that were previously hosted on the same physical server remain on the same physical server in the new placement result. It is to be noted that the term "infinite weight" as used herein does not necessarily mean that the weight has a literal value of ∞. In one embodiment, the infinite weight has a value of ∞. However, in other embodiments, the infinite weight has a value that is relatively large compared to other edge weight values of the graph. One having ordinary skill in the art will appreciate that the infinite weight can have any value sufficiently large enough that will prevent nodes connected by the pseudo edge from being separated by a graph partitioning algorithm. In one embodiment, the nodes are connected by infinite weight pseudo edges in a tree topology. Other types of topologies for connecting the nodes as would occur to one having ordinary skill in the art are contemplated as well.

The computing device runs a balanced minimum k-cut problem algorithm on the graph to thereby divide the graph into a same number of sub-graphs as a number of physical servers (block 430). Each sub-graph then represents one of the physical servers. The nodes of a sub-graph represent the VMs that are to be assigned to that physical server that the sub-graph represents. One having ordinary skill in the art will understand that any suitable balanced minimum k-cut problem algorithm can be used to partition the graph.

The computing device then maps a new VM to one of the physical servers based on a sub-graph to which a new VM node that represents the new VM belongs (block 435). In one embodiment, the new VM is mapped to a physical server based on the marking of an existing VM node or the marking of a pseudo VM node within the same sub-graph as the new VM node representing the new VM. In one embodiment, the computing device iterates through nodes of a sub-graph until it finds a node that is marked. The marking of that node is then used to identify the physical server that corresponds to that sub-graph. New VMs (represented by the new VM nodes) within that sub-graph can then be mapped to the identified physical server. One having ordinary skill in the art will appreciate that the iteration through the nodes can be performed in any order including a random order or even in parallel. In one embodiment, which physical server a sub-graph corresponds to can be based on a comparison of the sub-graph with the physical servers. For example, if a sub-graph has 3 existing VM nodes (not including the pseudo VM nodes) and there is only one physical server that has 3 existing VMs (prior to the new VM placement), then it can be determined that the sub-graph corresponds to that physical server. Correspondingly, the new VMs (represented by the new VM nodes) within that sub-graph can be mapped to the physical server corresponding to that sub-graph. In one embodiment, the computing device also initiates placement of the new VM on the physical server to which it has been mapped.

Thus, the process described above produces a traffic-aware VM placement that considers incremental VM placement in a data center where jobs dynamically arrive. The process also takes server heterogeneity into consideration. The process can be used to compute a desired VM placement result in real-time. The process may be particularly applicable to virtualized data centers in a general cloud environment.

Figure 5:
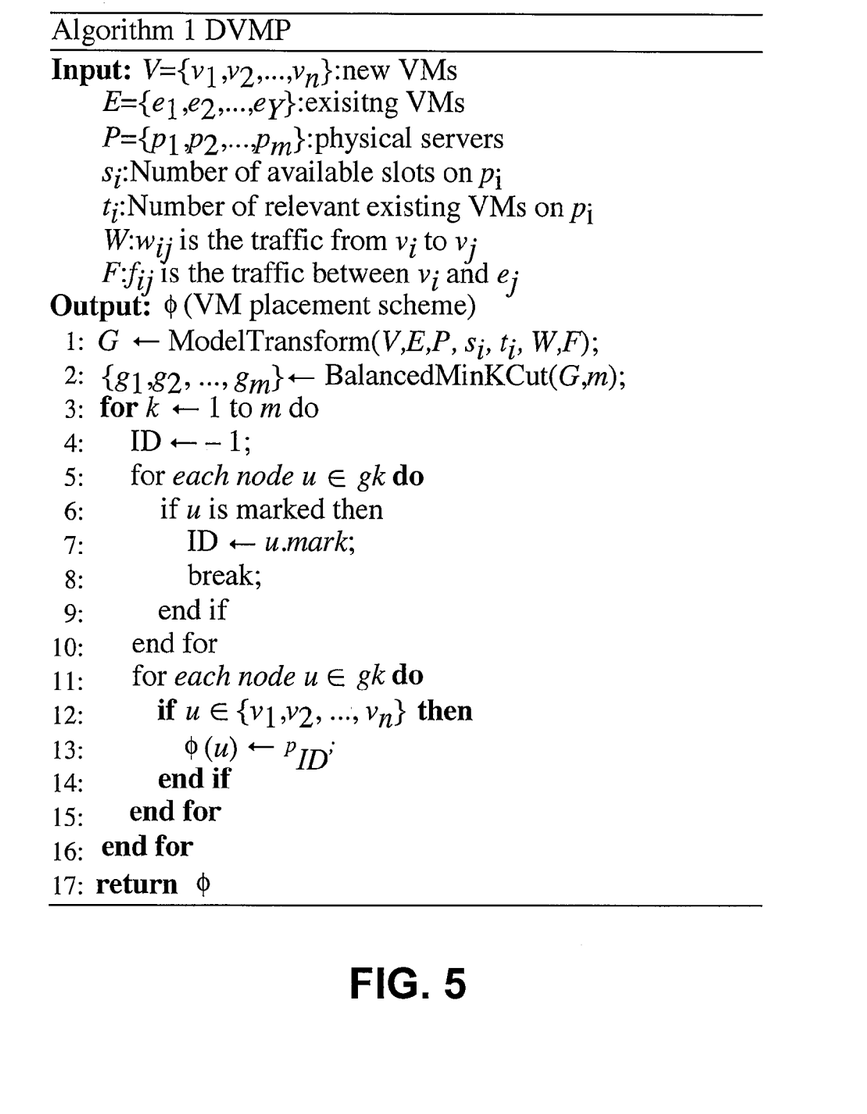
FIG. 5 is one embodiment of a pseudo-code for a traffic-aware VM placement algorithm that takes job dynamic and server heterogeneity into consideration.

FIG. 5 is one embodiment of a pseudo-code for a traffic-aware VM placement algorithm that takes job dynamic and server heterogeneity into consideration. The algorithm will be referred to hereinafter as the Dynamic VM Placement (DVMP) algorithm. The DVMP algorithm transforms the incremental VM placement problem to a BMKP problem, which is done by the ModelTransform( ) function (line 1). An example pseudo-code for the ModelTransform( ) function is described below with reference to FIG. 6 in more detail. The ModelTransform( ) function outputs a graph G on which existing heuristics (e.g., BalancedMinKCut( ) in line 2) can be applied to partition the graph into m equal sized sub-graphs $\{g_1, g_2, \ldots, g_m\}$ that minimize the total cross-server traffic. Each sub-graph is then mapped to its corresponding physical server, according to the marking of existing/pseudo VMs within it (lines 3-10). New VMs are then mapped to a physical server based on the sub-graph to which it (or more precisely, the node representing the new VM) belongs (lines 11-16). As a result, a desired VM placement scheme φ is obtained, which maps the new VMs to a physical server in a way that minimizes traffic across servers.

Figure 6:
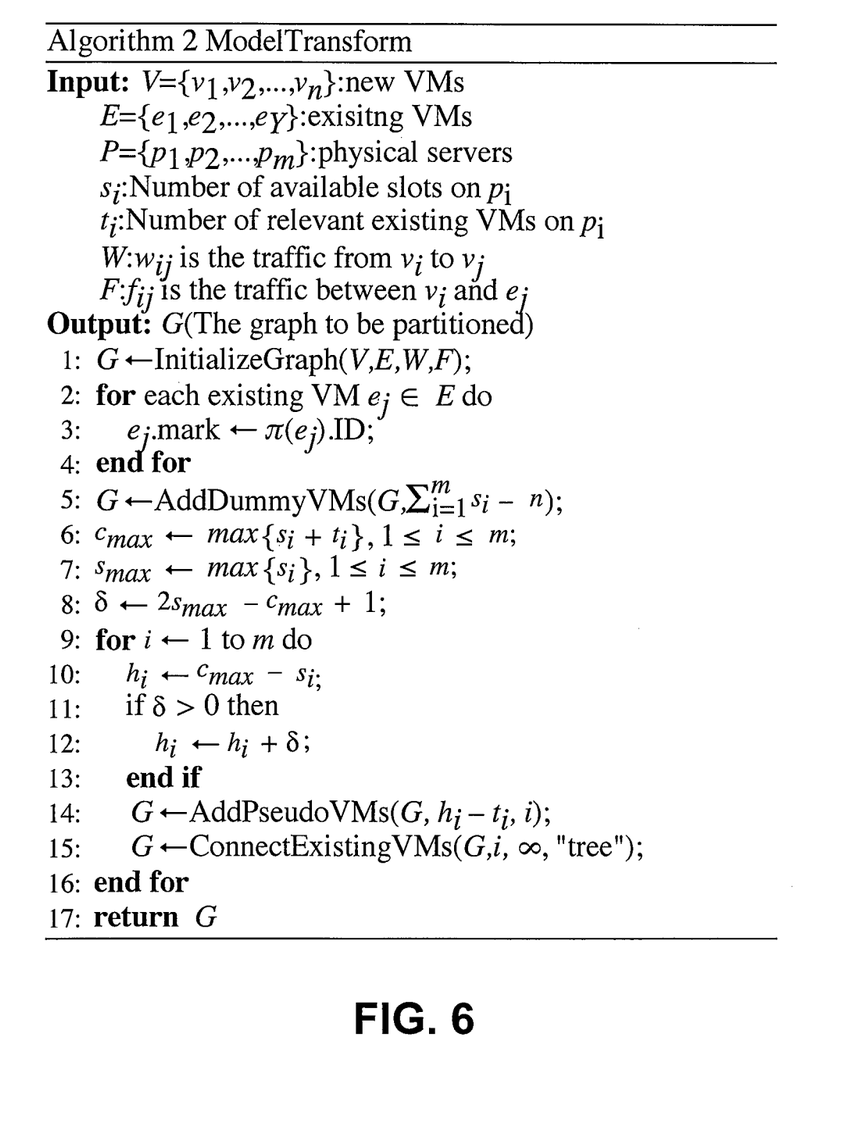
FIG. 6 is one embodiment of a pseudo-code for a ModelTransform( ) function.

FIG. 6 is one embodiment of a pseudo-code for a ModelTransform( ) function. A graph G is generated according to the communication relationship among all the new VMs and existing VMs (line 1). Existing VMs are marked with their hosting server identities to indicate that they should be mapped to back to their original hosting server (lines 2-4). Dummy VMs are added to the graph (line 5). The number of dummy VMs to be added, d, is given by $d=(\Sigma_{i=1}^{m} s_i)-n$. That is, the number of dummy VMs to be added is the difference between the total number of available VM slots across all physical servers and the number of new VMs to be deployed. Then, the number of VM slots on each server is unified to $c_{max}$ (or $c_{max}+\delta$, if $\delta>0$) by adding pseudo VM slots to the servers. For the i-th server, there are $h_i$ i-marked nodes in G, including $t_i$ existing VMs and $h_i-t_i$ pseudo VMs (lines 10-13). Then, AddPseudoVMs( ) is invoked to add $h_i-t_i$ pseudo VMs marked with identity i to the graph (line 14). All the i-marked nodes are connected in a tree topology by pseudo edges having a weight of infinity (line 15). As a result, the ModelTransform algorithm transforms a target model into a graph G that allows the target model to be solved using an existing BMKP algorithm.

The computing complexity of the DVMP algorithm is dominated by BalancedMinKCut( ), which has a time complexity of $O(|G|^4)$ and an approximation ratio of $$\frac{m-1}{m}|G|.$$

Given a job size of 200~300 VMs and a realistic traffic pattern between VMs, it takes less than one minute to run DVMP on a server installed with AMD Opteron™ Processor 4176HE 2.4G CPU*12 and 32 GB DRAM. Evaluations based on real-world workload show that embodiments of the traffic-aware VM placement processes described herein can significantly reduce network traffic compared to prior art VM placement schemes such as the greedy VM placement scheme or traffic-oblivious placement schemes.

For simplicity and clarity, the VM placement processes described herein focus on optimizing the amount of traffic that is imposed on the network when placing VMs. However, one having ordinary skill in the art will appreciate that other VM placement objectives such as load balancing and energy saving can also be taken into consideration when placing VMs. Also for simplicity and clarity, the VM placement processes described herein do not take into consideration the "traffic distance" in the network because the embodiments do not assume any particular physical network topology. However, one having ordinary skill in the art will appreciate that the processes described herein can be generalized to embrace any data center network topology.

Figure 7:
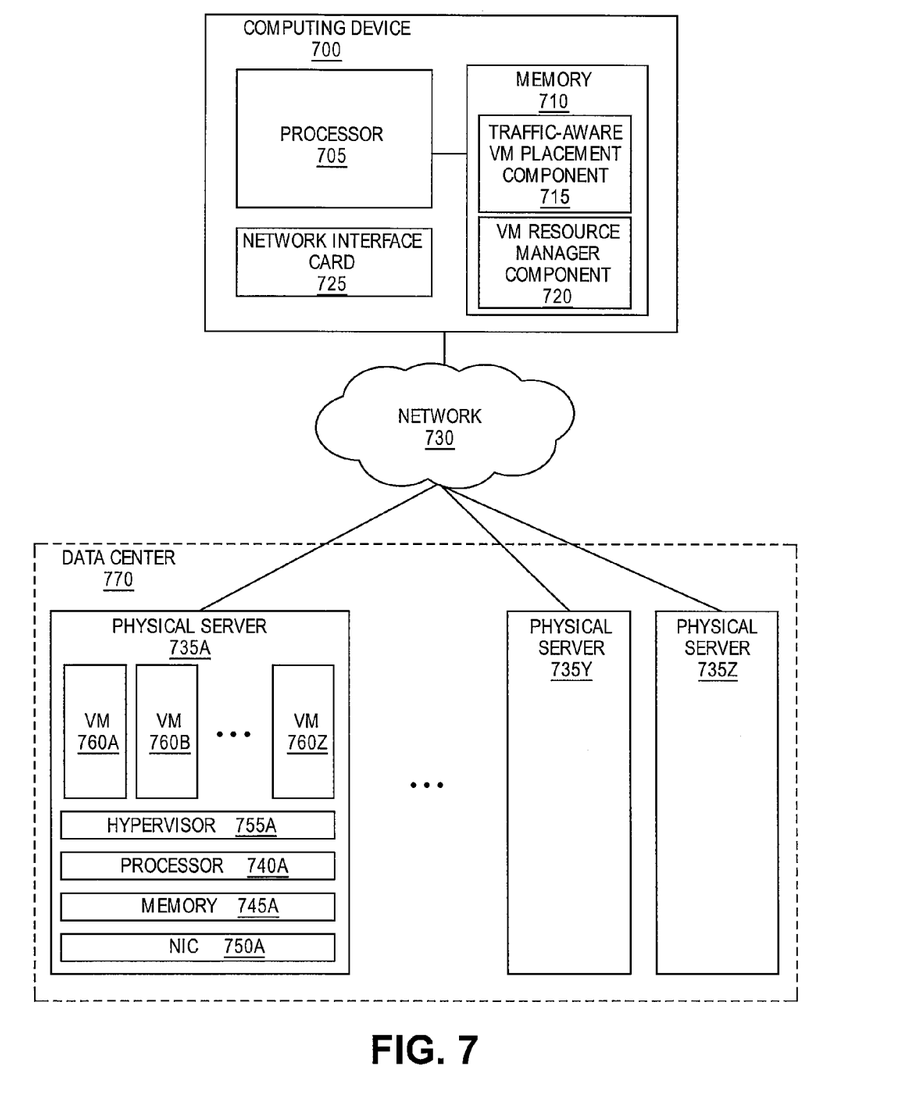
FIG. 7 is a block diagram of one embodiment of a computing device that can implement traffic-aware VM placement that takes job dynamic and server heterogeneity into consideration.

FIG. 7 is a block diagram of one embodiment of a computing device that can implement traffic-aware VM placement that takes job dynamic and server heterogeneity into consideration. The computing device 700 can perform some or all of the operations and methods described above for one or more of the embodiments. One having ordinary skill in the art will understand that the computing device is provided by way of example rather than limitation, and that other computing devices with differing configurations can implement some or all of the operations and methods described above for one or more of the embodiments. In the example embodiment, the computing device includes one or more processor(s) 705, memory 710, network interface controllers 725 (NICs; also known as network interface cards), a traffic-aware VM placement component 715, and a VM resource manager component 720. The computing device 700 is connected to one or more physical servers 735A-Z of a data center 770 over a wired or wireless network 730. In one embodiment, the computing device 700 serves as a VM resource manager of a data center 770.

The processor(s) 705 may include one or more data processing circuits, such as a general purpose and/or special purpose processor (e.g., microprocessor and/or digital signal processor). The processor(s) 705 is adapted to execute the traffic-aware VM placement component 715 and VM resource manager component 720 to perform some or all of the operations and methods described above for one or more of the embodiments, such as the embodiments of FIGS. 4-6.

In one embodiment, the processor(s) 705 is coupled to a memory 710 such as read-only memory (ROM), flash memory, dynamic random access memory (DRAM), magnetic disks, optical disks, phase change memory, or any type of non-transitory machine-readable media to store code for execution on the processor(s) 705 and/or to store data. The traffic-aware VM placement component 715 can be stored in memory and executed by the processor to perform some or all of the operations and methods described above for one or more of the embodiments. The VM resource manager component 720 can be stored in memory and executed by the process to manage VMs of a data center 770. For example, the VM resource manager component 720 can be executed to obtain the number of physical servers 735 in the data center that are available to host VMs, the number of VM slots (e.g., total slots, occupied slots, available slots) on each physical server 735, the traffic load between VMs, the network topology of the data center 770, and other information pertaining to the data center 770 and the physical servers 735 therein. In one embodiment, the VM resource manager component 720 may initiate deployment of a VM on a physical server 735, initiate migration of a VM to a different physical server 735, or initiate termination of a VM from a physical server 735.

The computing device 700 includes a set of one or more NICs 725 (which include physical network interface(s)) to establish network connections (to transmit and/or receive code and/or data using propagating signals) with other computing devices such as the physical servers 735A-Z in the data center 770 over the wired or wireless network 730.

Each of the physical servers 735A-Z in the data center can include hardware including one or more processor(s) 740, memory 745, and NICs 750. During operation, the processor(s) 740A may execute software to instantiate a hypervisor 755A (sometimes referred to as a virtual machine monitor (VMM)) and one or more virtual machines 760A-760Z that are run by the hypervisor 755A, which are collectively referred to as software instance(s). A virtual machine 760 is a software implementation of a physical machine that runs programs as if they were executing on a physical, non-virtualized machine; and applications generally do not know they are running on a virtual machine as opposed to running on a "bare metal" host computing device, though some systems provide para-virtualization which allows an operating system or application to be aware of the presence of virtualization for optimization purposes. Each of the virtual machines 760A-Z, and that part of the hardware that executes that virtual machine (be it hardware dedicated to that virtual machine and/or time slices of hardware temporally shared by that virtual machine with others of the virtual machine(s)), may occupy a separate VM slot.

In one embodiment, the physical servers 735A-Z of the data center 770 may be collocated in a physical location such as a warehouse. In other embodiments, one or more of the physical servers 735A-Z may be geographically distributed. One having ordinary skill in the art will understand that the arrangement of physical servers 735A-Z in the data center 770 is provided by way of example rather than limitation, and that some or all of the operations and methods described above for one or more of the embodiments can be applied to other data centers with differing configurations.

In one embodiment, the physical servers 735A-Z of the data center 770 may execute traffic-aware VM placement process functions described herein above. In one embodiment, the traffic-aware VM placement process functions are executed in a distributed manner across multiple physical servers 735A-Z. Thus, the traffic-aware VM placement process functions can be implemented as modules in any combination of software, including firmware, and hardware within the computing device 700 and/or the physical servers 735 of the data center 770. The functions of the traffic-aware VM placement process that are executed and implemented by the computing device and/or physical servers 735 can include those described further herein above.

While the invention has been described in terms of several embodiments, those skilled in the art will recognize that the invention is not limited to the embodiments described, can be practiced with modification and alteration within the spirit and scope of the descriptions provided herein. The description is thus to be regarded as illustrative instead of limiting.

The invention claimed is:

1. A method implemented by a computing device to provide traffic-aware virtual machine (VM) placement onto physical servers of a data center, the placement takes incremental VM job arrival and physical server heterogeneity into consideration, the method comprising the steps of:

forming a graph including a new VM node and an existing VM node, wherein the new VM node represents a new VM to be placed on one of a plurality of physical servers and the existing VM node represents an existing VM assigned to one of the physical servers, the graph further including an edge between the new VM node and the existing VM node, wherein the edge is assigned a weight that represents a traffic demand between the new VM node and the existing VM node;

marking the existing VM node as belonging to the one of the physical servers assigned to the existing VM;

adding dummy VM nodes to the graph such that a total number of new VM nodes and dummy VM nodes is equal to a total number of available VM slots on the physical servers;

adding pseudo VM nodes to the graph, wherein each pseudo VM node is marked as belonging to one of the physical servers, and wherein the pseudo VM nodes are added to the graph such that each of the physical servers has a same total number of VM slots and the total number of VM slots on each physical server is given by $c_{max}$ or $c_{max}+\delta$, wherein $c_{max}=\max\{s_i+t_i\}$ and $\delta=2s_{max}-c_{max}+1$, wherein $s_{max}=\max\{s_i\}$ and there are i physical servers available for VM placement, max denotes a maximum value operator, $s_j$ denotes a number of available VM slots on an i-th physical server, and $t_i$ denotes a number of existing VMs on the i-th physical server;

connecting nodes that are marked as belonging to a same physical server using a pseudo edge having an infinite weight;

running a balanced minimum k-cut problem algorithm on the graph to thereby divide the graph into a same number of sub-graphs as a number of physical servers; and mapping the new VM to one of the physical servers based on a sub-graph to which the new VM node that represents the new VM belongs.

2. The method of claim 1, further comprising:

initiating placement of the new VM on to the one of the physical servers to which the new VM has been mapped.

3. The method of claim 1, wherein each of the dummy VM nodes is not connected to any other node in the graph.

4. The method of claim 1, wherein the total number of VM slots on a physical server is a sum of a number of available VM slots on that physical server, a number of existing VM nodes marked as belonging to that physical server, and a number of pseudo VM nodes marked as belonging to that physical server.

5. The method of claim 1, wherein the nodes that are marked as belonging to a same physical server are connected by the pseudo edge in a tree topology.

6. The method of claim 1, wherein mapping the new VM to one of the physical servers is based on a marking of a node belonging to a same sub-graph as the new VM node that represents the new VM.

7. The method of claim 1, wherein the plurality of physical servers are part of a cloud data center, the method further comprising:

obtaining, from cloud statistics of the cloud data center, one or more of a number of available VM slots on each of the physical servers, a number of existing VMs on each of the physical servers, traffic demand between new VMs, traffic demand between new VMs and existing VMs, and a mapping of existing VMs to physical servers.

8. A computing device to provide traffic-aware virtual machine (VM) placement onto physical servers of a data center, the placement takes incremental VM job arrival and physical server heterogeneity into consideration, the computing device comprising:

a non-transitory machine readable medium to store a traffic-aware VM placement component; and a processor communicatively coupled to the non-transitory machine readable medium, the processor configured to execute the traffic-aware VM placement component, the traffic-aware VM placement component configured to form a graph including a new VM node and an existing VM node, wherein the new VM node represents a new VM to be placed on one of a plurality of physical servers and the existing VM node represents an existing VM assigned to one of the physical servers, the graph further including an edge between the new VM node and the existing VM node, wherein the edge is assigned a weight that represents a traffic demand between the new VM node and the existing VM node, the traffic-aware VM placement component further configured to mark the existing VM node as belonging to the one of the physical servers assigned to the existing VM, add dummy VM nodes to the graph such that a total number of new VM nodes and dummy VM nodes is equal to a total number of available VM slots on the physical servers, add pseudo VM nodes to the graph, wherein each pseudo VM node is marked as belonging to one of the physical servers, and wherein the pseudo VM nodes are added to the graph such that each of the physical servers has a same total number of VM slots and the total number of VM slots on each physical server is given by $c_{max}$ or $c_{max}+\delta$, wherein $c_{max}=\max\{s_i+t_i\}$ and $\delta=2s_{max}-c_{max}+1$, wherein $s_{max}=\max\{s_i\}$ and there are i physical servers available for VM placement, max denotes a maximum value operator, $s_j$ denotes a number of available VM slots on an i-th physical server, and $t_i$ denotes a number of existing VMs on the i-th physical server, the traffic-aware VM placement component further configured to connect nodes that are marked as belonging to a same physical server using a pseudo edge having an infinite weight, run a balanced minimum k-cut problem algorithm on the graph to thereby divide the graph into a same number of sub-graphs as a number of physical servers, and to map the new VM to one of the physical servers based on a sub-graph to which the new VM node that represents the new VM belongs.

9. The computing device of claim 8, wherein the non-transitory machine readable medium further stores a VM resource manager component, the VM resource manager component, when executed by the processor, is configured to initiate placement of the new VM on to the one of the physical servers to which the new VM has been mapped.

10. A non-transitory computer readable storage medium having stored therein instructions to be executed by a computing device to provide traffic-aware virtual machine (VM) placement onto physical servers of a data center, the placement takes incremental VM job arrival and physical server heterogeneity into consideration, the instructions when executed by the computing device cause the computing device to perform a set of operations comprising:

forming a graph including a new VM node and an existing VM node, wherein the new VM node represents a new VM to be placed on one of a plurality of physical servers and the existing VM node represents an existing VM assigned to one of the physical servers, the graph further including an edge between the new VM node and the existing VM node, wherein the edge is assigned a weight that represents a traffic demand between the new VM node and the existing VM node;

marking the existing VM node as belonging to the one of the physical servers assigned to the existing VM;

adding dummy VM nodes to the graph such that a total number of new VM nodes and dummy VM nodes is equal to a total number of available VM slots on the physical servers;

adding pseudo VM nodes to the graph, wherein each pseudo VM node is marked as belonging to one of the physical servers, and wherein the pseudo VM nodes are added to the graph such that each of the physical servers has a same total number of VM slots and the total number of VM slots on each physical server is given by $c_{max}$ or $c_{max}+\delta$, wherein $c_{max}=\max\{s_i+t_i\}$ and $\delta=2s_{max}-c_{max}+1$, wherein $s_{max}=\max\{s_i\}$ and there are i physical servers available for VM placement, max denotes a maximum value operator, $s_j$ denotes a number of available VM slots on an i-th physical server, and $t_j$ denotes a number of existing VMs on the i-th physical server;

connecting nodes that are marked as belonging to a same physical server using a pseudo edge having an infinite weight;

running a balanced minimum k-cut problem algorithm on the graph to thereby divide the graph into a same number of sub-graphs as a number of physical servers; and mapping the new VM to one of the physical servers based on a sub-graph to which the new VM node that represents the new VM belongs.

11. The non-transitory computer readable storage medium of claim 10, wherein the instructions when executed by the computing device cause the computing device to perform a further set of operations comprising:

initiating placement of the new VM on to the one of the physical servers to which the new VM has been mapped.

12. The non-transitory computer readable storage medium of claim 10, wherein each of the dummy VM nodes is not connected to any other node in the graph.

13. The non-transitory computer readable storage medium of claim 10, wherein the total number of VM slots on a physical server is a sum of a number of available VM slots on that physical server, a number of existing VM nodes marked as belonging to that physical server, and a number of pseudo VM nodes marked as belonging to that physical server.

14. The non-transitory computer readable storage medium of claim 10, wherein the nodes that are marked as belonging to a same physical server are connected by the pseudo edge in a tree topology.

15. The non-transitory computer readable storage medium of claim 10, wherein mapping the new VM to one of the physical servers is based on a marking of a node belonging to a same sub-graph as the new VM node that represents the new VM.

16. The non-transitory computer readable storage medium of claim 10, wherein the instructions when executed by the computing device cause the computing device to perform a further set of operations comprising:

obtaining, from cloud statistics of a data center that manages the plurality of physical servers, one or more of a number of available VM slots on each of the physical servers, a number of existing VMs on each of the physical servers, traffic demand between new VMs, traffic demand between new VMs and existing VMs, and a mapping of existing VMs to physical servers.

* * * * *